(12) United States Patent
Scheffel

(10) Patent No.: US 9,273,664 B2
(45) Date of Patent: Mar. 1, 2016

(54) HYDRAULIC CONTROL VALVE FOR A ONE-SIDED OPERATING DIFFERENTIAL CYLINDER HAVING FIVE CONTROL EDGES

(75) Inventor: Gerd Scheffel, Korschenbroich (DE)

(73) Assignee: Parker Hannifin Corporation, Cleveland, OH (US)

( * ) Notice: Subject to any disclaimer, the term of this patent is extended or adjusted under 35 U.S.C. 154(b) by 1155 days.

(21) Appl. No.: 13/030,376

(22) Filed: Feb. 18, 2011

(65) Prior Publication Data
US 2012/0211101 A1    Aug. 23, 2012

(51) Int. Cl.
*F15B 11/08*      (2006.01)
*F03B 15/00*      (2006.01)

(52) U.S. Cl.
CPC .............. *F03B 15/00* (2013.01); *Y02E 10/226* (2013.01)

(58) Field of Classification Search
USPC ............................................ 91/466, 440, 436
See application file for complete search history.

(56) References Cited

U.S. PATENT DOCUMENTS

| | | | |
|---|---|---|---|
| 3,273,468 A | 9/1966 | Allen | |
| 4,434,708 A * | 3/1984 | Bowden | 91/436 |
| 5,022,434 A * | 6/1991 | Tsukimoto | 137/596.2 |
| 5,218,897 A * | 6/1993 | Shirai et al. | 91/436 |
| 5,832,808 A * | 11/1998 | Ishizaki et al. | 91/447 |
| 6,116,142 A | 9/2000 | Bunge | |
| 6,116,143 A * | 9/2000 | Scheffel | 91/436 |
| 6,701,823 B2 * | 3/2004 | Weber et al. | 91/436 |
| 7,337,807 B2 * | 3/2008 | Koo et al. | 137/625.69 |

FOREIGN PATENT DOCUMENTS

| | | | | |
|---|---|---|---|---|
| DE | 10 2008059436 | | 1/2010 | |
| DE | 102008059436 | * | 1/2010 | ............. F15B 13/02 |
| DE | 102008038971 | * | 2/2010 | ............... F16L 3/24 |
| WO | 98/01677 A1 | | 1/1998 | |

* cited by examiner

*Primary Examiner* — Edward Look
*Assistant Examiner* — Daniel Collins
(74) *Attorney, Agent, or Firm* — Renner, Otto, Boisselle & Sklar, LLP

(57) ABSTRACT

A hydraulic control valve to control a double-acting working cylinder having a piston with a piston rod on one side, at least four external connections, and a device to feed the fluid forced from the small stroke space of the working cylinder into the large stroke space while the piston rod is moving out, and further for independent switching of the working cylinder from the work stroke to slow movement with a subsequent holding state to release pressure from the small stroke space, and wherein a connection of the small stroke space to the tank can be switched on. The control valve has five control edges, with two separate line paths formed to feed the fluid forced out of the small stroke space back with a back-feed control edge and a pressure-release control edge is formed to release pressure from the small stroke space to the tank.

11 Claims, 8 Drawing Sheets

HYDRAULIC CONTROL VALVE FOR A ONE-SIDED OPERATING DIFFERENTIAL CYLINDER HAVING FIVE CONTROL EDGES

CROSS REFERENCE TO RELATED APPLICATIONS

The present application claims the benefit of the filing date of German Patent Application No. 10 2010 009 085.9 filed Feb. 24, 2010, the disclosure of which is expressly incorporated herein by reference in its entirety.

TECHNICAL FIELD

The present invention relates to hydraulic control valve for a differential cylinder working on one side with five control edges.

BACKGROUND OF THE INVENTION

The invention concerns a hydraulic control valve to control a piston with a piston rod on one side with a double-acting working cylinder, whereby the control valve constructed in the piston-moving structure has at least four external connections with ring channels form in the valve housing, namely a pump connection (P), a connection (A 1) for a feed line to and from the large stroke space of the working cylinder, a connection (B) for a feed line to the small stroke space of the working cylinder, and a tank connection (T1) connected to the tank and whereby the control piston of the piston collar of the control valve has control edges arranged on It. through which the connections (P, A1, B, T1) can be connected to one another in both positions of the control piston in such a way that during the work stroke of the working cylinder, a back feed of the fluid forced out of the small stroke space into the large stroke space of the working cylinder takes place as the piston rod is moved out and a connection of the small stroke space to the tank can be switched on for stroke-independent switching of the working cylinder from the work stroke when moving slowly, with a subsequent standing state to release the pressure of the small stroke space of the working cylinder A control valve with the above-mentioned characteristics is described in DE 10 2008059 436 83. The construction of the control valve should make possible a movement of the piston of the working cylinder with a differential effect, that is, a fast piston movement is envisioned, in which a back feed of the fluid forced out of the small stroke space of the working cylinder during the work stroke of the differential cylinder is envisioned, i.e., when the piston rod is moved out, so that the pump must deliver only the same supply quantity both during the work stroke of the working cylinder and during its back stroke with each insertion of the piston rod. To implement his back feed, a fifth internal ring channel is formed in the valve housing of the known control valve, which channel is connected through internal bridges formed in the valve housing to the ring space belonging to connection A. In the working position of the control piston during a back stroke, connection 8, which is connected to the small stroke space of the working cylinder, is connected to the ring channel belonging to connection A through the fifth ring channel and the internal bridges connected to it, so that the fluid forced out of the small stroke space is led to connection A and from there to the large stroke space of the working cylinder.

In addition, in the control valve known from DE 10 2008 059 436 B3, a control function is already achieved that, at least at the end of the working stroke, with the piston rod pulled almost completely out, the full force made available by the pump is no longer used to move the piston, but is used as a holding force. For this, in the control valve known from DE 10 2008 059 436 B3, it is envisioned that the housing-internal bridges leading away from the fifth internal ring channel to the ring spaces belonging to both connection A and to the tank connection are closed, whereby in a connection hole designed for this between the housing-internal bridges and the ring space belonging to connection A, a valve-internal check valve with a pass-through device directed to connection A and in the section of the housing-internal bridges leading to the ring space belonging to the tank connection in the connection hole going upstream from the housing-internal bridges, an externally controllable lock valve to open and close the connection from the internal ring channel to the tank connection T are arranged. If a switch is now made from the rapid piston movement with back feed to the full holding force, then by switching the valve-internal lock valve from its lock position to its open position, the connection between connection B and connection T is opened. With this, the additional back feed of fluid forced out of the small stroke space of the working cylinder is interrupted and the small stroke space is released directly to the tank, so that the pressure acting on the large surfaces of the piston of the working cylinder in the large stroke space is not longer counteracted by pressure in the small stroke space of the working cylinder, and accordingly the holding force against the state while the piston rod is moving out is in any case doubled by the symmetric design of the working cylinder.

In a control valve of this kind, the problem results that during the work stroke of the working cylinder, the fluid forced out of its small stroke space during the entire work stroke is directed over the same control edges of the control piston from B to A 1 or T1. While during the rapid piston movement of the control piston a correspondingly larger volume stream is forced out of the small stroke space and through connection B and the associated control edges from B to A1 into the large stroke space, this volume stream during the holding place or during the transition to it is clearly lower, so that for this work phase of the working cylinder, the control edges from B to A 1 are designed too large The invention is therefore based on the task of providing a control valve designed for different phases during the work stroke, namely during rapid forward movement of the piston and during the subsequent holding phase, according to the generic characteristics, so that the hydraulic tension of the working cylinder is adapted through the control to the volume stream flowing at each time.

The solution of this task, including advantageous embodiments and further developments of the invention can be seen from the content of the patent claims attached to this description.

The invention envisions, in its basic thought, that on a control valve with at least three piston collars with five control edges formed on it, two separate line paths for the fluid forced out of the small stroke space during the work stroke of the piston are established, of which the first, a line path formed as a back feed for the supply and discharge line connected to the small stroke space through a recess acting as a back-feed edge connected to the large stroke space of the working cylinder and the second, a line path formed to connect the small stroke space to the tank, a line path formed to connect the small stroke space to the tank, leads through a pressure-release control edge formed on an assigned piston collar of the control valve, whereby the recess in the assigned control piston is for the fluid stream forced out of the small stroke space of the working cylinder during slow movement and is designed to be smaller than the other recesses of the piston collar formed for the other control edges.

An advantage of the present invention is that the work phase of holding the piston with full holding force now is arranged with a smaller control edge corresponding to a lower volume stream on the piston collar, through which an exact hydraulic tension for the working cylinder is ensured during all work phases. Switching with the lock valve that is still required is all simpler to achieve than the use of the path valve envisioned in the state of the art.

SUMMARY OF THE INVENTION

At least one embodiment of the invention provides a separate line path for the fluid forced out of the small stroke space during the work stroke of the piston is directed through a corresponding branch of the supply and discharge line before the assigned control edges of the control piston. For this, It is envisioned that supply and discharge line to the small stroke space Is arranged to be branched into two branches, the two line strands forming the first line path of the piston collar are assigned to the back-feed control edge and the line strand forming the second line path is assigned to the piston collar with the pressure-release edge, whereby in the position of the control piston designed for the work stroke of the cylinder, the back-feed control edge creates the connection of the first line strand to the large stroke space of the work cylinder, and in the line strand of the check valve with too large a stroke space, a pass-through device is switched on and the pressure-release control edge creates the connection of the second line strand to the tank through a discharge line that accepts the working cylinder to switch an external controllable lock valve turned on inside it.

In order to create the required connections for the two different line strands that can each be brought in to function during the work stroke of the working cylinder, according to one embodiment example of the invention, it is envisioned that to each line strand, an additional ring channel formed in the valve housing is assigned, to the line strand to the large stroke space is assigned to the one opening into the ring channel having the check valve, and the other additional ring channel, the one with the line strand leading to connection B, the discharge line having the lock valve to block or connect the piston collar forming the pressure-release edge is assigned.

The structure according to the invention can be realized with various valve structures with different numbers of external connections; this depends, in the end, on whether the connections required at the time between the ring spaces of the standard connections T1, A 1, P, B, and/or additional housing connections and the additionally formed ring spaces according the invention are arranged inside or outside the valve housing. The essential thing is that the control pistons used each time have at least five control edges, from which control edges of different sizes are assigned to the supply and discharge line to the small stroke space of the working cylinder are assigned as back feed control edges and pressure-release control edges.

According to a first embodiment of the invention, it can be envisioned that the branching of the supply and discharge line connected to the small stroke space, both line strands, as well as the discharge line with the lock valve to the tank are formed inside the valve housing.

An arrangement of this kind can be realized first with a control valve with four external connections, T1, A 1, P, and B, in that the connection of the additional ring channel to the large stroke space is created by means of another ring channel to be connected through the back-feed control edge and bridges leading from it inside the housing to the ring space belonging to connection A1, whereby in the bridges, a check valve with a pass-through device directed toward connection A1 is switched on.

According to a further development of the invention, the control valve can have, in addition to the four standard connections, T1, A1, P, and B, a fifth extremely connection A2, whereby now, in contrast to a control valve having four extremely connections, the connection of the additional ring channel to the large stroke space is created by means of another ring space assigned to the additional connection A2 to be connected to the ring channel through the back-feed control edge and by means of a connecting line leading to the external connection A2 and leading to the large stroke space of the working cylinder.

The control valve with five control edges to form the structure according to the invention is characterized in that during the back stroke of the piston in the working cylinder, the large amount of fluid forced out of the large stroke space of the working cylinder must be directed over the control edge from A 1 to T1, which is to be designed correspondingly large. In order to avoid this and to create equal flow paths as far as possible, according to one embodiment example of the invention, an additional sixth connection T2 can be arranged that can be connected through an additional piston collar to a sixth control edge to the connection line leading to the small stroke space of the working cylinder, so that the connection line to and/or from the large hollow space of the working cylinder can also be used for the back flow of part of the fluid forced out of the large stroke space during the back stroke.

To the extent that, according to an alternative embodiment, the branching of the lines connected to and from the small stroke space, both line strands, and the discharge line having the lock valve to the tank can each be arranged outside the valve housing, the control valve is to be provided with the required number of extremely connections. Thus it can be envisioned that in addition to the extremely connections T1, A 1, P, B, AZ and T2, the line strand having the check valve is connected from the branching on the outside to a seventh extremely connection connected to the ring space B1 and the connection T2 connected to the additional ring space controlled by the pressure-release control edge is connected to the tank through the discharge line having the lock valve. To this extent, a division of the fluid forced out of the large stroke space does not occur during the back stroke of the piston.

Accordingly, in a further development, to divide the fluid stream forced out of the large stroke space, into two equal partial streams, another eighth connection can be envisioned, whereby connection T2 can be connected through a fourth piston collar to an addition sixth control edge with connection A2 and connection T3, to which the additional ring space controlled by the pressure-release control edge Is connected and through which the discharge line having the lock valve is connected to the tank.

To the extent that in the embodiment examples of the invention with six or eight external connections, additional connections A2, T2 are envisioned in addition to the standard connections T1, A1, P, B, the result with these control valves is a different arrangement of additional ring spaces inside the valve, specifically, depending on whether a valve with six or with eight external connections is involved.

Thus, according to a first embodiment example of the invention, It is envisioned that with respect to the standard connections T1, A 1, P, B, they are near connection B, and the additional ring spaces in the valve housing 21 are arranged between connection B and connection A2. In both these cases, an identical control piston is used for the valve with six connections and the valve with eight connections, whereby also the ring spaces to be drilled in the valve housing are also identical.

Alternatively, It can be provided that connections A2, T2, with respect to the standard connections T1, A1, P, and B are arranged near connection T1 and one additional ring space is arranged to lie outside next to the ring space belonging to connection B and the second addition ring space is arranged to He outside next to the ring space belonging to connection A2. Also, in this case, independent of the construction of the valve housing with six or eight connection, the control piston and the holes of the ring spaces can be kept identical.

BRIEF DESCRIPTION OF THE DRAWINGS

In the drawings, embodiment examples of the invention are reproduced, which will be described in the following.

The above drawings give only the initial positions for the following functional explanation, without a view to the representing the mass embodiment of the control valve, so the constructive design and the choice of dimensions will be made by the average expert with knowledge of the desired functional interconnections of the invention.

DETAILED DESCRIPTION OF THE INVENTION

Figure 1:
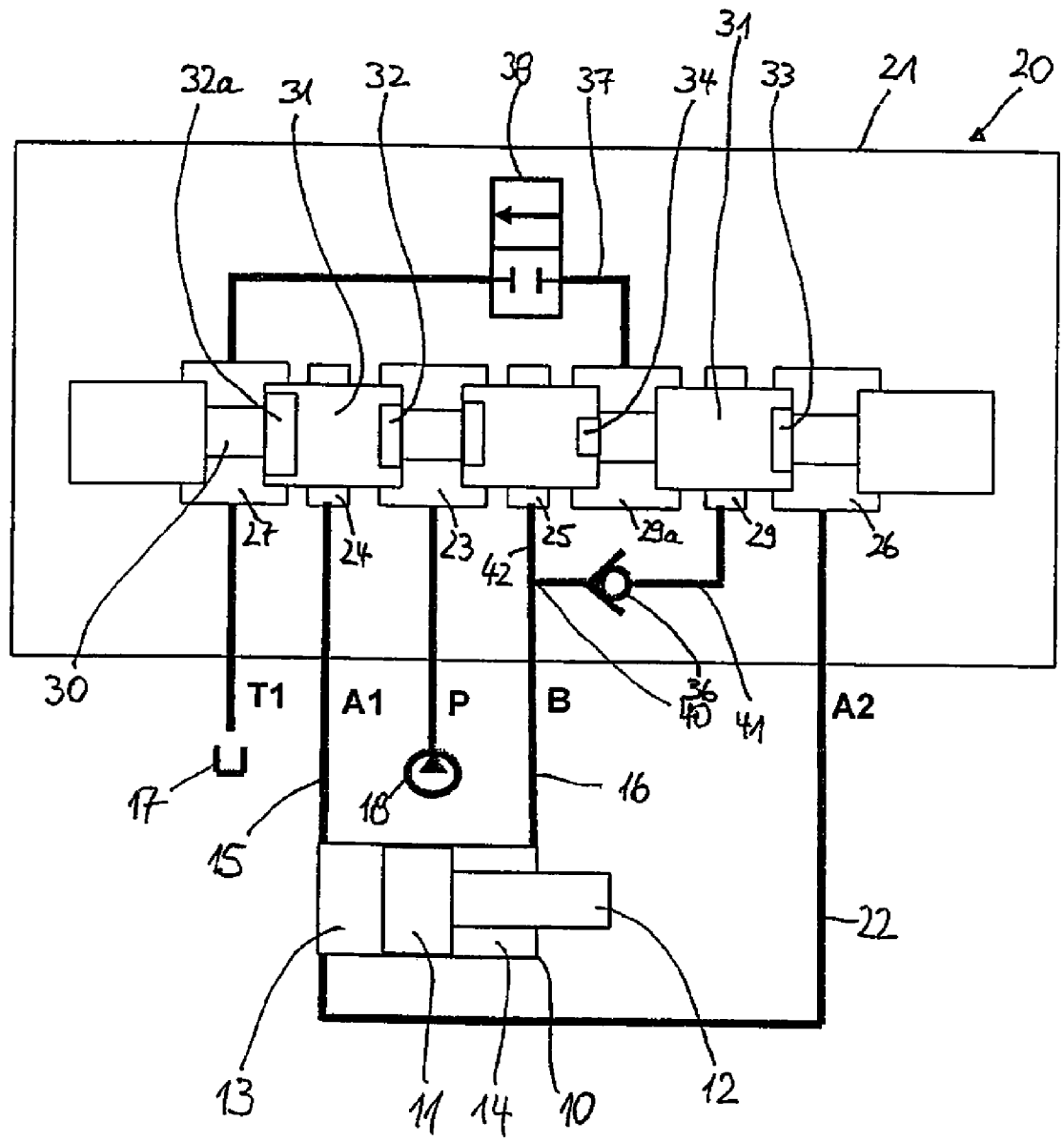
FIG. 1 is a FIG. 1 shows a hydraulic control valve having five external housing connections with five control edges with a working cylinder connected to it, in a schematic representation.

An embodiment of the present invention as shown in FIG. 1, shows a working cylinder 10 with a piston 11, which moves in it and has various surfaces on both sides, with a piston rod 12. The piston 11 divides the working cylinder 10 to a large stroke space 13 and a small stroke space 14. Each stroke space 13, 14 is connected through a supply and discharge line 15, 16 respectively to and from it for the fluid, with user connections A 1, B of a control valve 20, whereby the control valve 20 is further connected to a tank 17 and a pump 18.

To this extent, to the valve housing 21 of the control valve 20, four standard connections, T1, A 1, P, and B are formed, whereby connection P is connected to the pump 18, connection A 1 is connected through the supply and discharge line 15 to the large stroke space of the working cylinder 10, and connection B is connected through supply and discharge line 16 to the small stroke space of the working cylinder 10. The tank connection T1 is arranged to the tank 17. Furthermore, on the valve housing 21, a fifth external connection A2 is formed, which is connected through an external connection line 22 running on the outside to the large stroke space 13 of the working cylinder or to the supply and discharge line 15 to it.

Inside the valve housing 21, the ring spaces of the individual housing connections mentioned above are arranged, specifically a ring space 23 for connection P, a ring space 24 for connection A1, a ring space 25 for connection B, a ring space 26 for connection A2, and a ring space 27 for connection T1. In addition, between ring spaces 25, 26 belonging to connections B and A2, yet another additional ring space 29 and a second additional ring space 29a are arranged, to which, however, no external connections are arranged in the valve housing 21.

In the hole of the valve housing 21, a control piston 30 can be moved, which has a piston collar with a total of three to five control edges formed as recesses 32 and 33, 34 are ground out on the outside of the piston collar. In this case, recess 34 has a smaller size that recesses 32, 33. In the initial position of the control piston 30, two piston collars 31 each block one of connections A1 and B.

Not further shown, as they are assumed to be known, pre-controls are formed to contribute to the control movements of the control piston 30 at both ends of the control piston 30 in the valve housing 21, whereby by applying an appropriate control oil to the pre-controls, the control piston 30 can be moved in both directions in the control housing 21, so that the piston collar 31 formed on the control piston 30, switches the desired valve function with respect to the five housing connections in the valve housing 21. This is known in the state of the art.

In order be able to perform a back feed of the working cylinder 10 during the work stroke, that is, during the movement of the piston rod 12 out of the working cylinder 10, the fluid forced out of the small stroke space 14 into the large stroke space 13 of the working cylinder 10, connection A2 is provided, which is connected to connection B in a way yet to be described and to the external connection line 22 to the large stroke space 13 of the working cylinder 10.

To set different-acting line strands during the back feed, on the one hand, and during the pressure release of the small stroke space 14 to the 17, on the other, a branching 40 for the fluid directed through connection B is provided inside the valve housing 21, from which a line strand 41 intended for the back feed a line strand 42 intended for the pressure release have their exit. Line strand 41 is connected to the first additional ring space 29 in the connection hole formed in the valve housing, which is arranged next to connection A2 and can be connected to it through an assigned piston collar 31 formed as a recess 33 acting as a back-feed control edge.

Furthermore in the embodiment example shown in FIG. 1, a discharge line 37 lying inside the valve housing 21 between the second ring space 25 belonging to connection B and the second additional ring space 29a and the tank connection T1, in which a lock valve 38 is turned on.

To the extent that a connection between connection P and connection A 1 is created during the work stroke of the working cylinder 10 in the position of the control piston 30 displaced to the left and connection T1 is blocked by a corresponding piston collar, the back-feed connection from B to A2 is created in this piston position by the fluid flowing into line strand 41 leaving from the branching 40 in the direction of the first additional ring space 29 and thereby the check valve 36 turned on in line strand 41 opens toward the first ring space 29. To the extent that at the same time in the position of the control piston 30 displaced to the left a connection of ring space 25 belonging to connection B to the second additional ring space 29a is connected through recess 34, the lock valve 38 in the discharge line going from additional ring space 29a is found to be in its lock position, so that no fluid can flow through this path. It is thus only possible for the fluid to flow from connection B through the branching 40, line strand 41, the first additional ring space 29, and the recess 33 formed as a back-feed control edge into the ring space 37 belonging to connection A2 and from connection A2 through the connection hole 22 in the large stroke space 13 of the working cylinder 10. Accordingly, the volume stream delivered by the pump P through connection A 1 is increased by the back-feed quantity of fluid from the small stroke space 14 of the working cylinder 10 and a rapid movement of the piston 11 is given in the working cylinder 10.

If now a switch is made from the rapid forward movement of the piston 11 to a slow movement or the subsequent holding phase, then the lock valve 38 is opened. With this, the pressure relationship on the supply and discharge line 16 are changed in such a way that now connection B is released through line strand 42, the pressure-release control edge (recess 34), the additional ring space 29a, and the discharge line 27 to the tank connection T1, so that also in line strand 41 inside the valve pressure is no longer applied that would be sufficient to open the check valve 36. To this extent, after the lock valve 38 is open, the small stroke space 14 of the working cylinder 10 to connection T1 is released from pressure, while the back feed directed through line strand 41 of the fluid forced from the small stroke space 14 is stopped by the check valve 36 remaining in the closed position.

For the back stroke of the piston 11 in the working cylinder 10, the control piston 30 is moved to the right with respect to the position shown in FIG. 1, so that the connection from P to B is now opened. At the same time, in the position of the control piston 30 moved to the right, a connection from connection Al to T1 is created, whereby connection A2 is blocked by the piston collar 31. Thus the fluid forced out of the large stroke space 13 of the working cylinder 10 during the back stroke of the piston 11 flows through line 15 and connection Al to the tank connection T1. It is understood that the control edge working in this (recess 32a) must be designed appropriately large, in order to capture the entire fluid stream flowing from the large stroke space 13. To this extent, recess 32a must be designed twice as large as the other recesses 32. In addition, in the corresponding position to the right, also the ring space 25 assigned to connection B is blocked against the second external ring space 29a, so that the fluid pumped by the pump to B cannot get to the discharge line 37, which is in any case blocked by the lock valve 34 in this work phase.

As can be seen from the structure of the control valve 20 described above, during the rapid movement of the piston 11, the fluid forced out of the small stroke space 14 is directed through the back-feel control edge (recess 33) to the back feed, while during the switch of the rapid forward movement of the piston 11, recess 34 on the control piston 30 acts as a pressure-release control edge on a smaller volume stream by the opening of the lock valve 38 and the associated pressure release of the small stroke space 14 to the tank 17 on a smaller volume stream.

Figure 2:
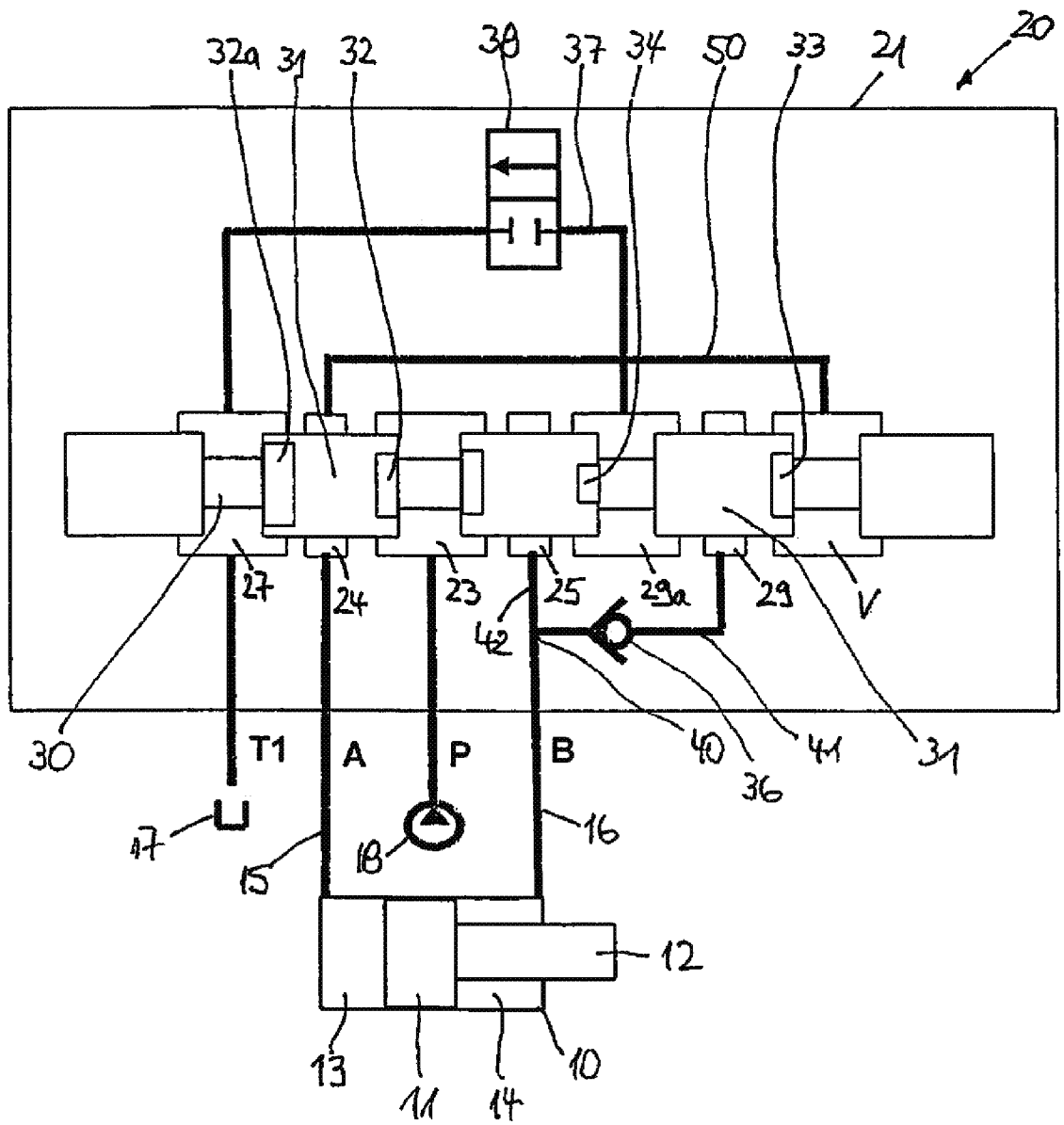
FIG. 2 shows a functional control valve corresponding to FIG. 1, with four external housing connections and five control edges.

In the embodiment example shown in FIG. 2, the valve housing 21 has only the four external standard housing connections T1, A1, P, B, so that the fifth connection A2 that can be seen in FIG. 1 is omitted. In order still to be able to make a back feed of the fluid quantity forced out of the small stroke space 14 from connection B to the large stroke space 3, ring space 26, which is assigned to connection A2 in FIG. 1, is replaced by a valve-internal ring space V, which in turn is connected through a bridge 50 formed inside the valve housing 21 to the ring space 24 belonging to connection A 1. To this extent, in the embodiment example shown in FIG. 2, line strand 41 is still available as a back-feed path that can be connected by means of the back-feed control edge (recess 22) to the valve-internal ring space V between additional ring space 29 and the bridge 50, so that fluid forced out of the small stroke space 14 is directed to connection A 1, Otherwise, the flow paths act as described for FIG. 1.

Figure 3:
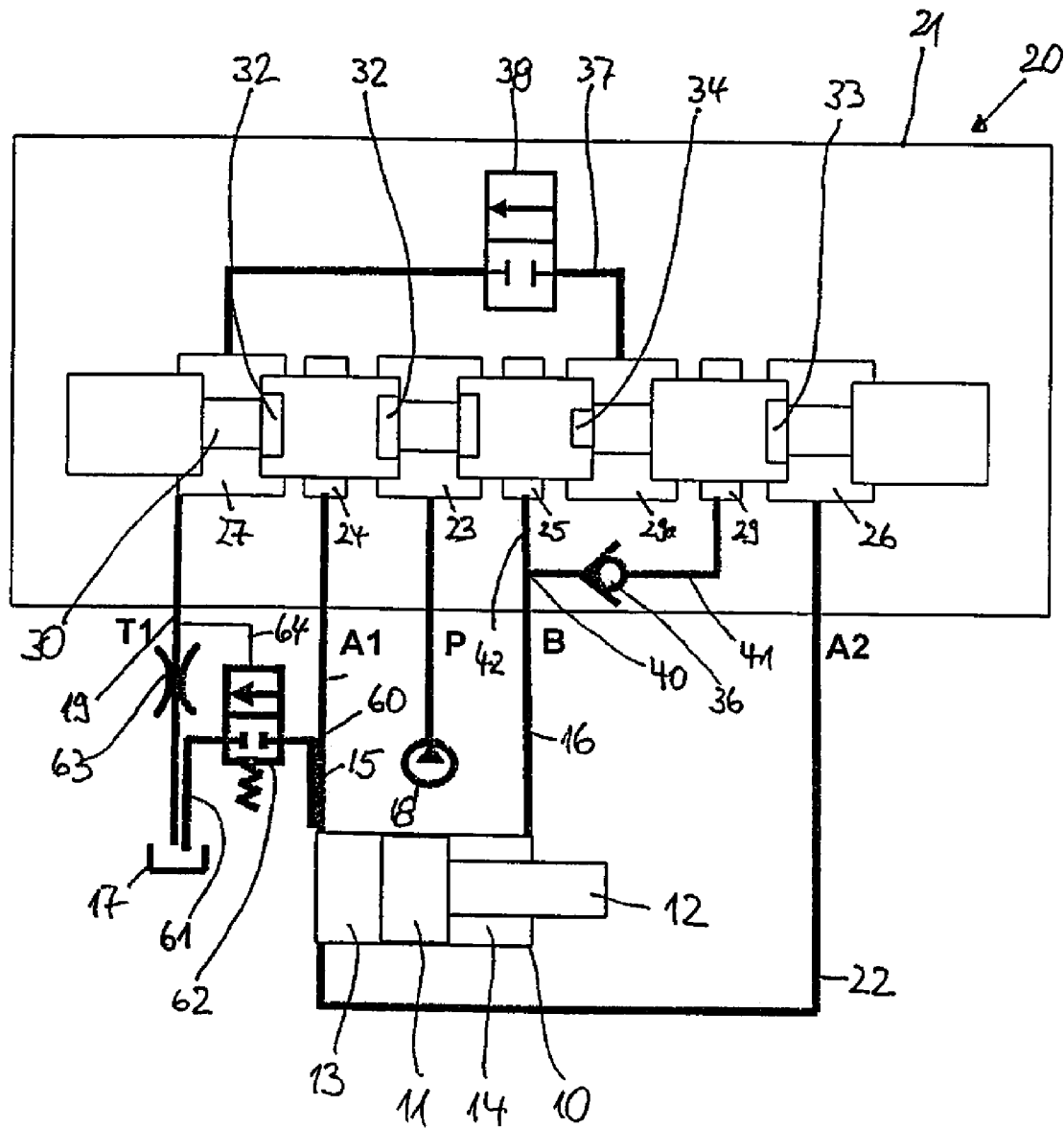
FIG. 3 shows a control valve constructed according to FIG. 1, with inclusion of a pressure-dependent switch valve for directing the fluid forced out of the large stroke space of the working cylinder back to the tank.

The embodiment example show in FIG. 3 differs from the embodiment example described in FIG. 1 only in that an additional discharge path to the tank 17 is created for the fluid forced out of the large stroke space 13 during the back stroke of the piston 11, in that in supply and discharge line 15, a line branching 50 is turned on, from which a discharge line is directed directly to the tank 17. In this discharge line 61, a pressure dependent switch valve 62 is turned on. In order for the switch pressure required for switching the switch valve 62 to be reached, a throttle 63 is included in the line 19 leading from connection T1 to the tank 17, whereby a sensor line 64 leading to the switch valve 62 is connected to the line segment lying between the throttle 63 and connection T1. By means of the throttle 63, the fluid stream is set that is to be directed from the large stroke space 13 of the working cylinder 10 through connections A 1 and T1 of the control valve 20 to the tank. If the cross-section of the throttle 63 is not sufficient for the corresponding fluid stream to pass through, a corresponding pressure is built up in the line segment between connection T1 and the throttle 63, which is captured by the sensor line 64 and directed to control the pressure-dependent switch 18 valve 62, so that the switch valve 62 is opened against a spring action and the additional path to the tank 17 is made free through the discharge line 61. Because of the arranges of this additional line path, the control edge from A1 to T1 in the form of the assigned recess 32 can be formed the same size as the other control edges 32 on the valve piston 30, so that a corresponding symmetric shape is given to the control piston.

Figure 4:
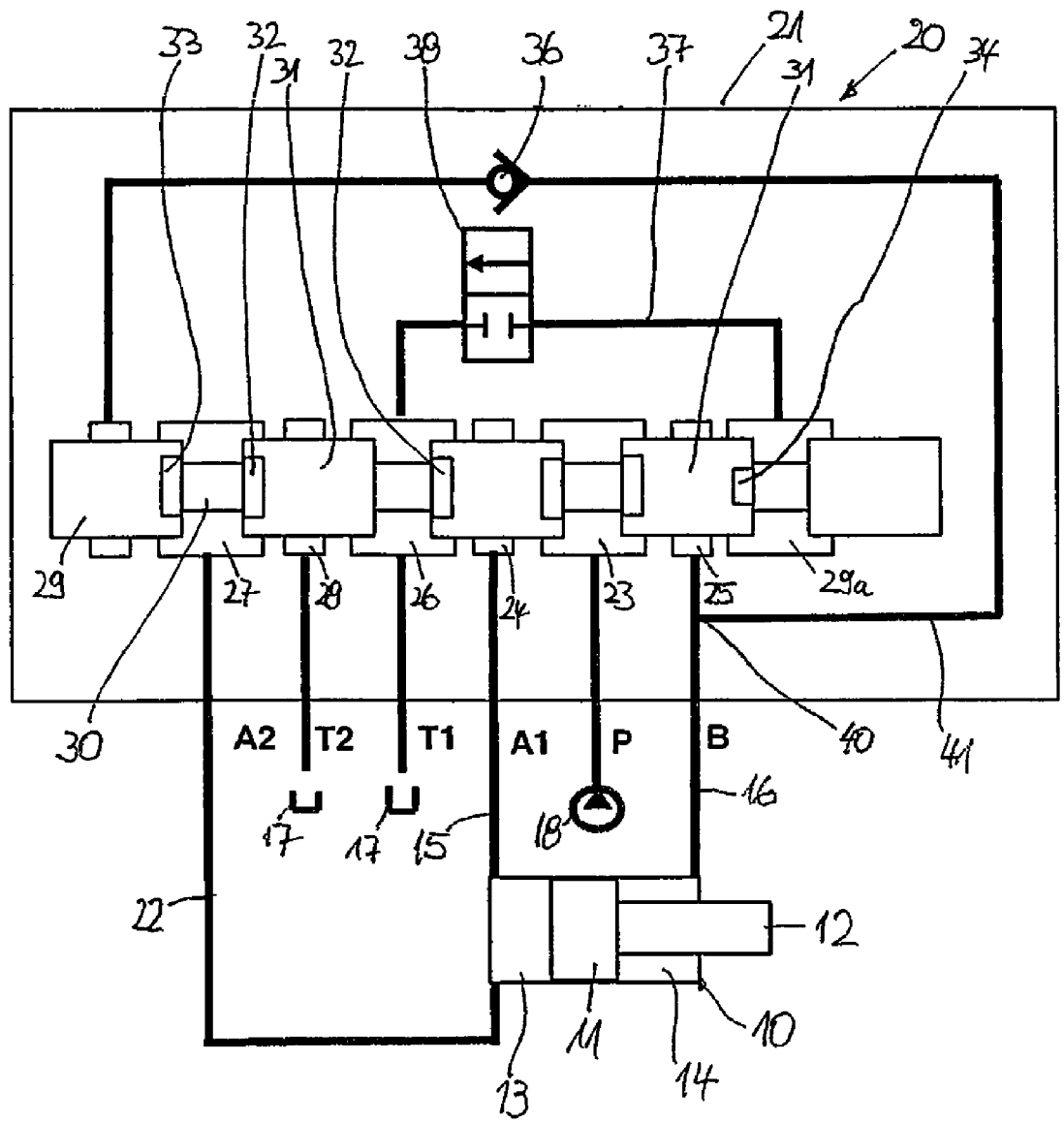
FIG. 4 shows a control valve having six external housing connections with six control edges.

In the example embodiment shown in FIG. 4, the problem of the division of fluid forced out of large stroke space 13 during the back stroke of the piston 11 into two partial streams is solved in that a sixth housing connection T2 is now envisioned in the valve housing 21, adjacent to the large stroke space 13 through housing connection A2 connected through the connection line 22 and can be connected to an additional sixth control edge (recess 32) formed on the piston collar. With this, the fluid forced out of the large stroke space 13 during the back stroke of the piston 11 is divided into two partial streams that flow on the one hand through line 15 and connection A 1 to the tank connection T1 and [on the other] through line 22 and connection A1 to tank connection T2. In the corresponding piston position to the right, the connection of connection A2 to the first extremely ring space 29 and the subsequent line strand 41 is blocked at the same time, so that fluid coming out of line 22 cannot flow through valve-internal line strand 41 to connection B. In addition, this connection is also blocked by the check valve 36.

Figure 5:
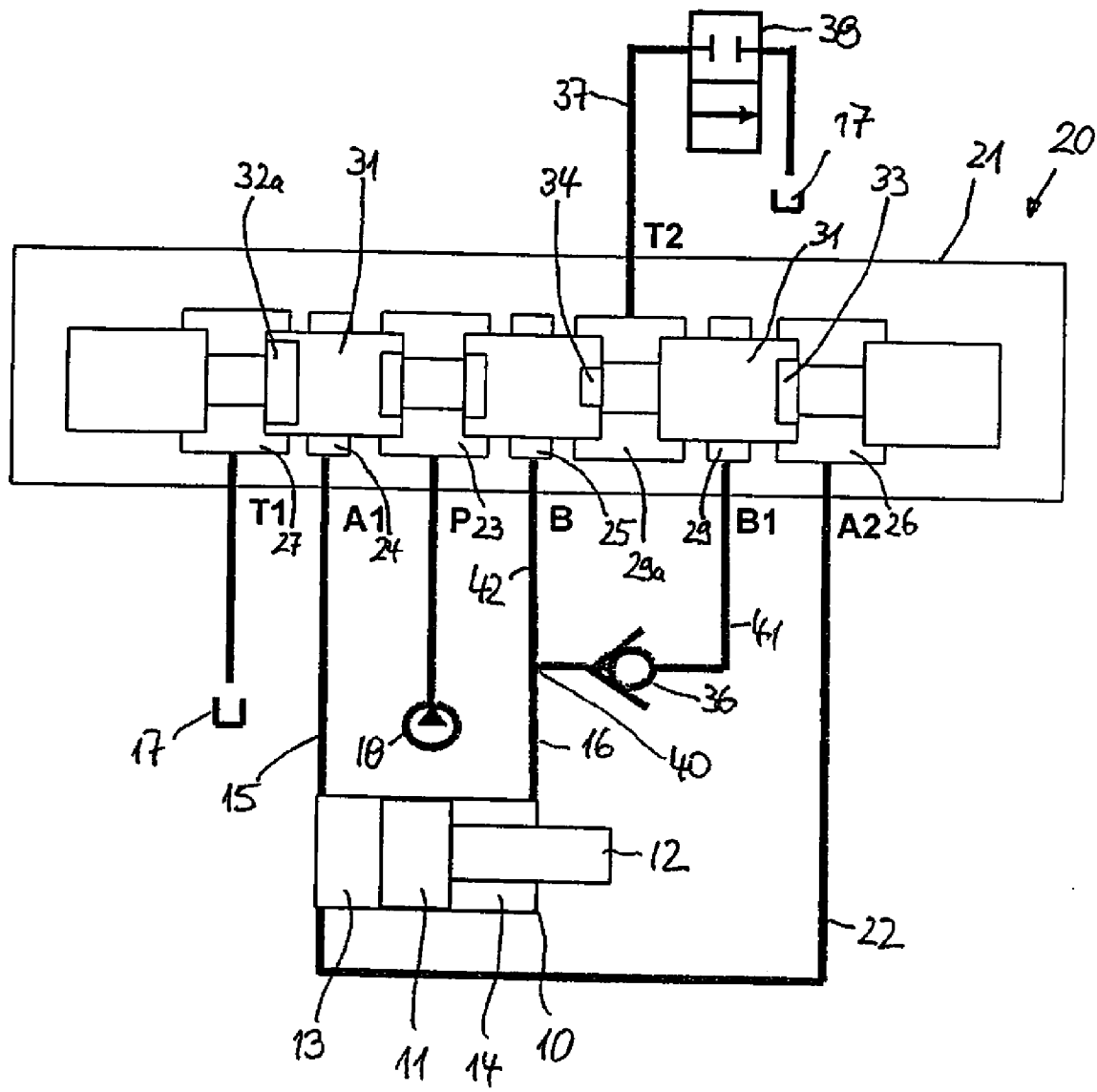
FIG. 5 shows a hydraulic control valve having seven extremely housing connections with five control edges.

FIG. 5 shows an embodiment example of the invention in which the branching 40 of the two line strands 41 and 42 and the discharge line having the lock valve 38 to the tank are now arranged outside the valve housing, through which a corresponding number of housing connections is needed. In addition to the housing connections T1, A1, p, B, A2, and T2 already described in FIG. 4, a seventh external housing connection B1 is provided, which is now assigned to the first additional ring space 29 and is connected to this extent by line strand 41 to the check valve 36 lying outside. Furthermore, in the embodiment example shown, connection T2 is no long assigned to connection A2, and to this extent it serves to discharge the fluid forced out of the large stroke space 13, but connection T2 is assigned to the additional ring space 29a, so that a discharge line 45, now lying outside, is connected to connection T2 to the lock valve 28 included inside it. To this extent, the fluid directed through connection T2 during the pressure release through connection B and the pressure-release control edge (recess 34) is directed directly to the tank. It is understood that in this embodiment example, again, a division of the fluid forced out of the large stroke space 13 of the working cylinder 10 is not possible, so that either the control edge from A 1 to T1 (recess 32a) must be formed correspondingly large (as shown) or else an additional connection is created outside the valve housing between line 14 and the tank 17.

Figure 6:
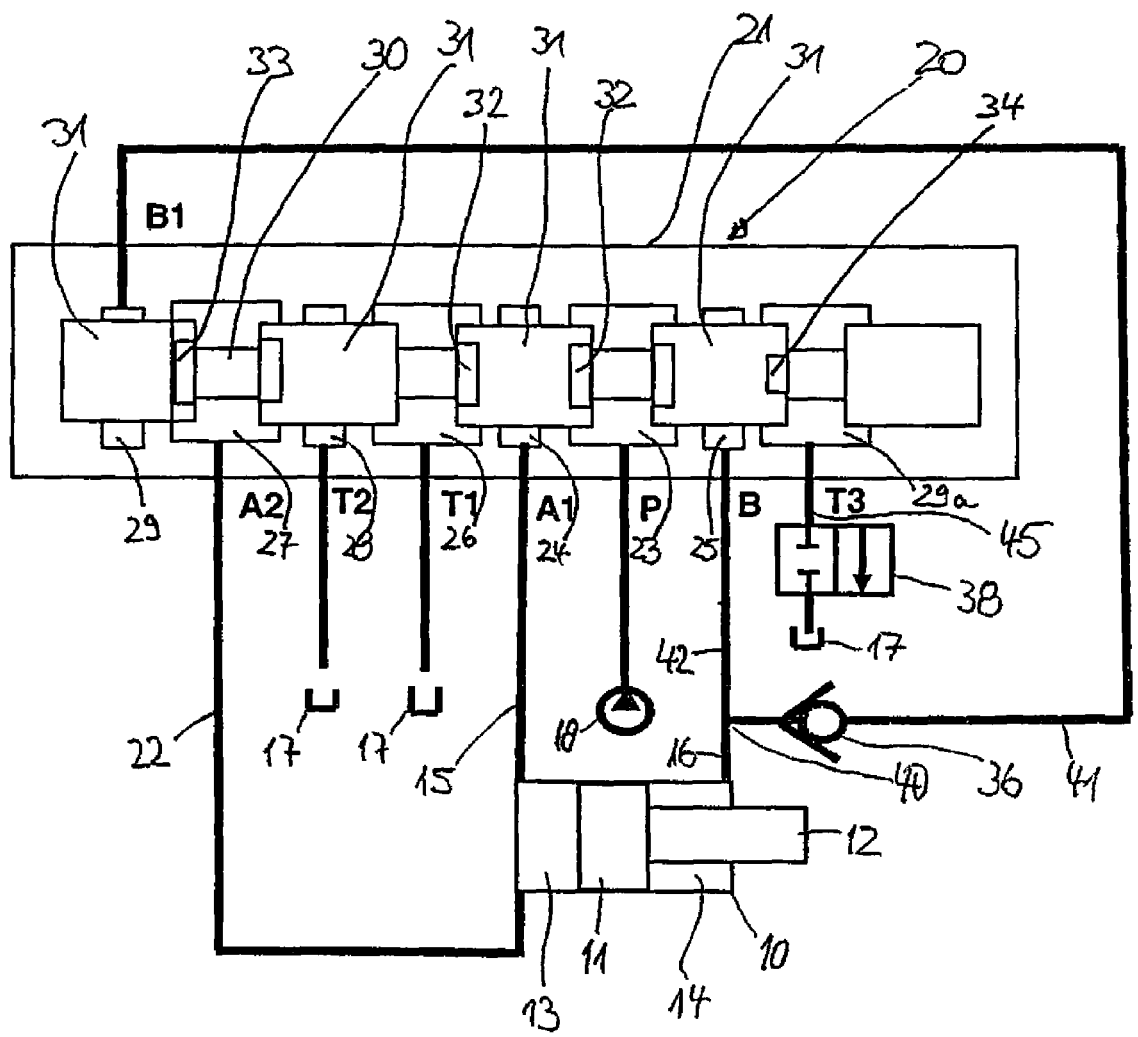
FIG. 6 shows a control valve constructed according to FIG. 4, with six control edges and with eight external housing connections and connection lines lying outside.

If it is desired to proved the embodiment example show in FIG. 5 with the possibility of directing the entire fluid stream from the large stroke space 13 through the control valve 20, then another, thereby an eighth external connection T3 must be provided according to the embodiment example shown in FIG. 6. As can be seen from a comparison of FIGS. 3 and 5, the ring space 29a adjacent to ring space 25 belonging to connection B is now assigned to the eighth connection T3 with the discharge line 45 leading from it 20 and to lock valve 38 included in it. Connection T2 is to be connected in the same way as already described in FIG. 4 through an assigned control edge (recess 32) to connection A2, to which, again, the connection line 22 coming from the large stroke space 13 is connected. In the embodiment example show in FIG. 6, there is a somewhat different arrangement of the external connections, whereby in the same way is in FIG. 5, connection B1 is arranged next to connection A2 and is to be connected to it through the back-feed control edge (recess 33). Otherwise, the flow paths here too are executed in the individual positions of the control piston 30, as described.

The embodiment parts shown in FIGS. 4 and 6 correspond to one another to the extent that six control edges (recesses 32, 33, 34) are formed on the control piston 30. From a comparison of FIGS. 4 and 5, it can also be seen that the formation and arrangement of the additional ring spaces 29 and 29a in the valve housing 21, as well as the formation of the control piston 30 with the six control edges formed on it (recesses 32,33,34) are identical.

Figure 7:
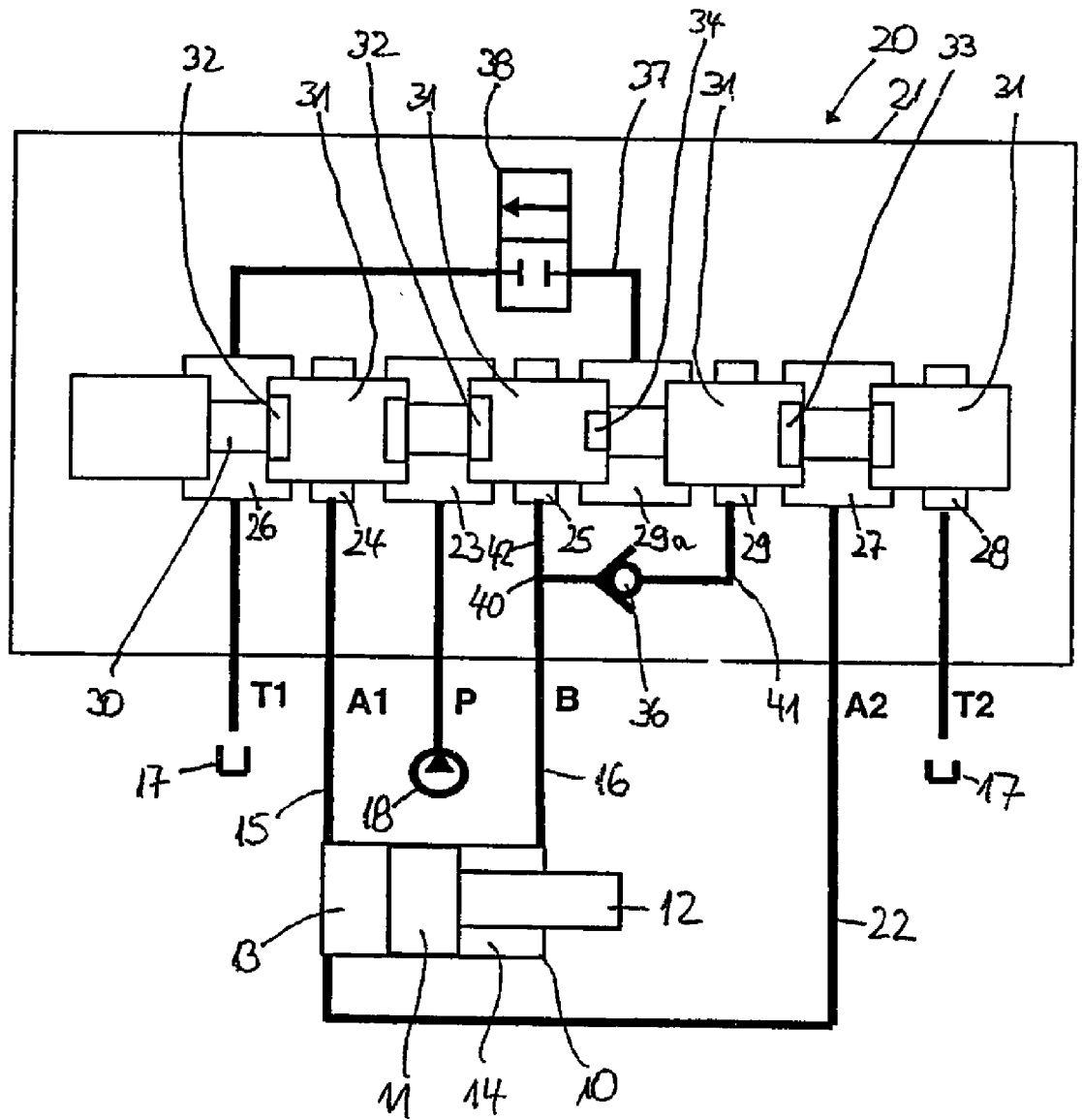
FIG. 7 shows the control valve according to FIG. 4, with six external housing connections and six control edges, in another embodiment.
Figure 8:
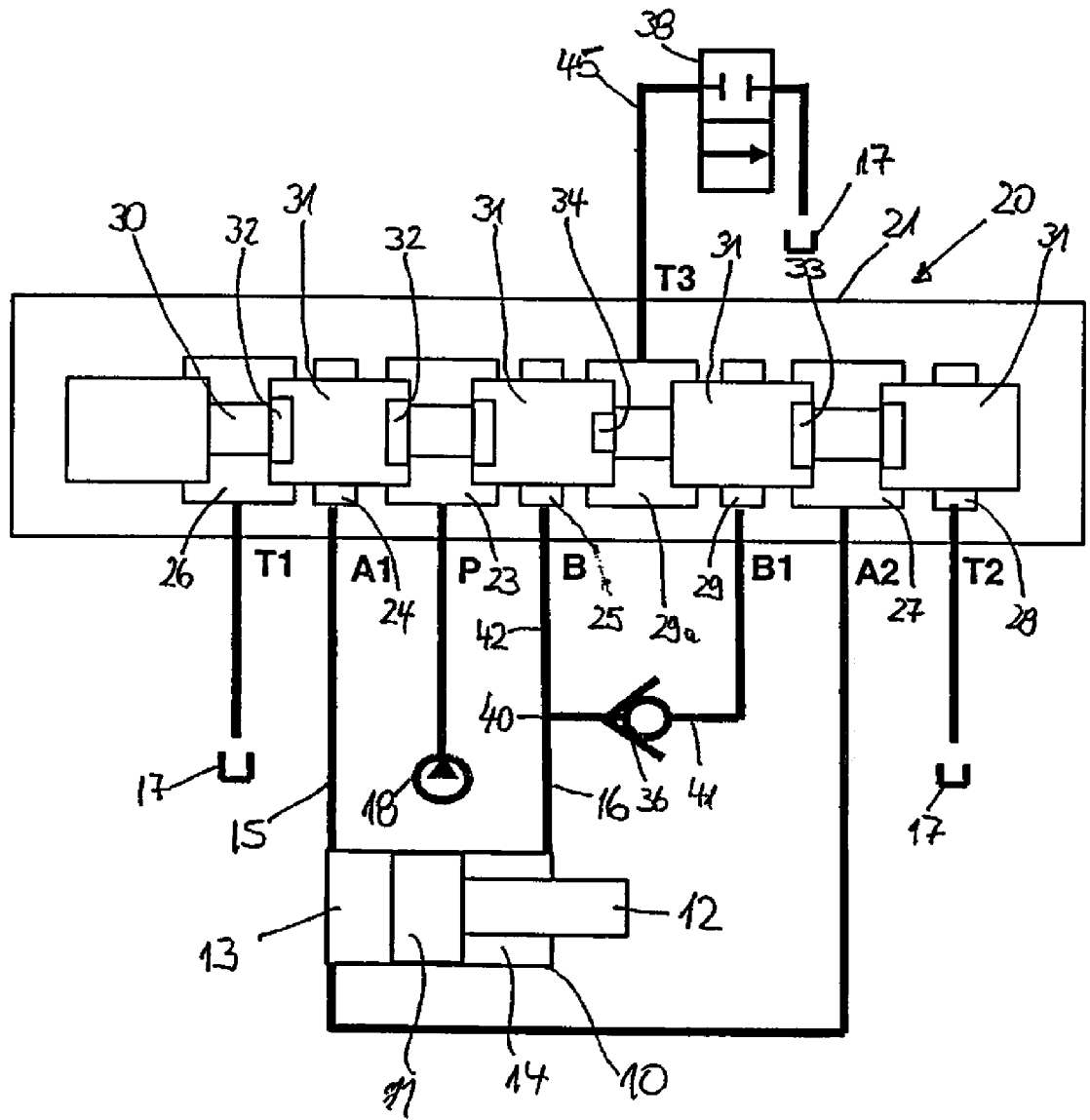
FIG. 8 shows the control valve constructed according to FIG. 7, with eight external housing connections and connection lines lying outside.

The embodiment examples shown in FIGS. 7 and 8 differ from the embodiment examples shown in FIGS. 4 and 6 only in that connections A2, T2 arranged adjacent to connection B with respect to the standard connections T1, A 1, P, B. This has the consequence that in order to implement the control functions described, the additional ring spaces 29 and 29a are arranged between ring space 25 belonging to connection B and ring space 27 belonging to connection A2.

According to FIG. 7, a line strand intended for the back feed and again formed inside the valve housing 21 from the branching 40 to the supply and discharged line 16 to the small stroke space 14 of the working cylinder 10 opens into the additional ring space 29, which, in the control-piston position for the work stroke, opens through the assigned piston collar 30 to connection A2 with the recess 33 acting as the back-feed control edge, so that during the back feed, the fluid forced out of the small stroke space 14 flow through connection e, the branching 50, and line strand 41 to connection A2 and from there through connection line 22 to the large stroke space 13. Correspondingly, the check valve 36 is including in line strand 51, opening to the additional ring space 29.

The other line strand 42 acting during the pressure release of the small stroke space 14 leads from the branching 40 to ring space 25 assigned to connection e, which is connected through a piston collar 31 to the smaller recess 34, which acts as a pressure release control edge, from which the valve-internal discharge line 37, which leads to the valve-internal discharge line 37, with the lock valve 38 turned on, to the ring space 26 belonging to the tank connection T1. Thus after the opening of the block valve 38, the fluid forced from stroke space 14 through connection e, the branching 40, line strand 42, and the valve-internal discharge line 37 to the ring space 26 belonging to the tank connection T1 and from there to the tank 17. Otherwise, the flow paths for the fluid directed through the control valve correspond to the description of FIG. 1.

The example embodiment shown in FIG. 8 agrees with the example embodiment described in FIG. 7, to the extent that, again, the additional ring spaces 29 and 29a 22 are assigned to external connections 81 and T3, so that the control valve shown in FIG. 8 has eight external connections, compared to the control valve shown in FIG. 7. Also with this embodiment example with eight external connections, the flow paths for the fluid directed through the control valve correspond to the description given for FIG. 7.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A hydraulic control valve to control a double-acting working cylinder including a piston with a piston rod on one side, the hydraulic control valve comprising a valve housing having formed therein at least four external connections with assigned ring channels formed in the valve housing, the external connections including
a pump connection (P);
a connection (A1) for a supply and discharge line to the large stroke space of the working cylinder;
a connection (B) for a supply and discharge line to the small stroke space of the working cylinder; and
a tank connection (T1) for a connection to the tank; and
a control piston having a piston collar with control edges arranged on it, by which the external connections can be connected to one another in two positions of the control piston in such a way that during the work stroke of the working cylinder, a back feed of the fluid forced out of the small stroke space into the large stroke space occurs while the piston rod is moving out, and for stroke-independent switching of the working cylinder from the work stroke to slow movement with a subsequent holding state to release pressure from the small stroke space of the working cylinder, a connection of the small stroke space to the tank can be switched on, wherein the control piston has at least three piston collars with five control edges formed on it and the valve housing has two separate line paths for the fluid forced from the small stroke space during the work stroke of the piston, of which a first line path, established for the back feed, connects the supply and discharge line connected to the small stroke space through a recess acting as a back feed control edge to the large stroke space of the working cylinder, and the second line path, formed to connect the small stroke space to the tank, leads to a pressure-release control edge formed on an assigned piston collar of the hydraulic control valve, whereby the recess forming the pressure-release edge in the assigned piston collar is designed for the fluid stream forced out of the small stroke space of the working cylinder and is dimensioned smaller than the recesses of the piston collar forming the other control edges.

2. A hydraulic control valve according to claim 1, wherein the supply and discharge line that connects to the small stroke space is branched in a branching into two line strands to which the first line strand is assigned to the piston collar having the back-feed control edge and the second line strand is assigned to the piston collar having the pressure-release control edge, whereby in the position of the control piston for the work stroke of the cylinder, the back-feed control edge creates the connection of the first line strand to the large stroke space of the working cylinder, and a check valve with a pass through device is included in the line strand to the large stroke space and the pressure-release control edge creates the connection of the second line strand to the tank through an externally controllable lock valve to switch the discharge line that accepts the working cylinder.

3. A hydraulic control cylinder according to claim 2, wherein the line strand is assigned to an additional ring channel formed in the valve housing, one of which ring channels is assigned to the piston collar forming the back-feed control edge to block or connect the line strand having the check valve opening into the ring channel to the large stroke space and the other ring channel is assigned to the piston collar forming the pressure-release edge to block or connect the discharge line having the lock valve going from the ring channel to the line strand leading to connection (B) for a supply and discharge line to the small stroke space of the working cylinder.

4. A hydraulic control valve according to claim 3, wherein the branching of the supply and discharge line connected with the large stroke space, the two line strands, and the discharge line having the lock valve to the tank are formed Inside the valve housing.

5. A hydraulic control valve according to claim 4, wherein the connection of the additional ring channels to the large stroke space is created by means of another Internal ring channel through the back-feed control edge to be connected and a bridge going from the inside of the housing to the ring space belonging to the connection (A1), whereby a check valve is included in the bridge with a pass-through device directed toward the connection (A1).

6. A hydraulic control valve according to claim 3, wherein the hydraulic control valve has a further external connection (A2) and the connection of the additional ring channel to the large stroke space is created by means of a ring space assigned to the further external connection (A2) through the back-feed control edge to be connected and by means of a connection line leading to the further external connection (A2) and to the large stroke space of the working cylinder.

7. A hydraulic control valve according to claim 6, wherein the hydraulic control valve has another external connection (T2), and a fourth piston collar with an additional sixth control edge is provided to connect the connection (A2) to connection (T2).

8. A hydraulic control valve according to claim 3, wherein the branching of the discharge line to the tank having the connected supply and discharge line arranged to the small stroke space, the two line strands, and the lock valve are arranged outside the valve housing and the hydraulic control valve has a further external connection (A2) and another external connection (T2), and that the line strand having the check valve leads from the branching to a seventh external connection formed on the outside and connection (B) connected to the ring space and the connection (T2) connected to the additional ring space controlled by the pressure release control edge is connected through the discharge line to the tank having the lock valve.

9. A hydraulic control valve according to claim 8, wherein the hydraulic control valve has an eighth external connections (T3), whereby connection (T2) can be connected through a fourth piston collar to an additional sixth control edge to connection (A2) and connection (T3) can be connected to the ring space controlled by the pressure-release control edge and through the discharge line having the lock valve to the tank.

10. A hydraulic control valve according to claim 7, wherein the external connections (A2, T2) are adjacent to connection (B) with respect to the standard connections (T1, A1, P, B) and the additional ring spaces in the valve housing are arranged between connection (B) and connection.

11. A hydraulic control valve according to claim 7, wherein the connections (A2, T2), are arranged adjacent to connection with respect to the standard connections (T1, A1, P, B), and an additional ring space lying outside next to the ring space belonging to connection (B) and the second additional ring space is arranged next to the ring space belonging to connection.

* * * * *

UNITED STATES PATENT AND TRADEMARK OFFICE
CERTIFICATE OF CORRECTION

PATENT NO. : 9,273,664 B2  
APPLICATION NO. : 13/030376  
DATED : March 1, 2016  
INVENTOR(S) : Gerd Scheffel Page 1 of 1

It is certified that error appears in the above-identified patent and that said Letters Patent is hereby corrected as shown below:

Title page, item (30), Foreign Application Priority Data should be added:
-- Foreign Application Priority Data
(30)   German Application No. 10 2010 009 085.9 filed on February 24, 2010. --

Signed and Sealed this
Twenty-third Day of August, 2016

Michelle K. Lee
*Director of the United States Patent and Trademark Office*